United States Patent
Sano et al.

(10) Patent No.: US 7,530,284 B2
(45) Date of Patent: May 12, 2009

(54) MULTIPLATE CLUTCH OUTER PART

(75) Inventors: Hiroshi Sano, Shizuoka (JP); Takahiro Ito, Shizuoka (JP)

(73) Assignee: Kabushiki Kaisha F.C.C., Shizuoka (JP)

(*) Notice: Subject to any disclaimer, the term of this patent is extended or adjusted under 35 U.S.C. 154(b) by 303 days.

(21) Appl. No.: 11/448,988

(22) Filed: Jun. 8, 2006

(65) Prior Publication Data
US 2007/0284212 A1 Dec. 13, 2007

(51) Int. Cl.
*F16D 13/58* (2006.01)
(52) U.S. Cl. .................. 74/434; 192/70.2
(58) Field of Classification Search .......... 192/70.2; 74/438
See application file for complete search history.

(56) References Cited

U.S. PATENT DOCUMENTS

| | | | |
|---|---|---|---|
| 5,388,474 A * | 2/1995 | Tanaka et al. | 74/434 |
| 6,095,006 A * | 8/2000 | Morita et al. | 74/434 |
| 6,719,114 B2 * | 4/2004 | Kumagai et al. | 192/70.2 |
| 2004/0035667 A1 * | 2/2004 | Prater | 192/70.2 |

FOREIGN PATENT DOCUMENTS

| | | |
|---|---|---|
| JP | 64-35123 A | 2/1989 |
| JP | 02-258120 A | 10/1990 |
| JP | 3-288018 | 12/1991 |
| JP | 2869871 B2 | 1/1999 |
| JP | 2869872 B2 | 1/1999 |
| JP | 11-320011 A | 11/1999 |
| JP | 2005-98426 A * | 4/2005 |

* cited by examiner

*Primary Examiner*—Richard M. Lorence
(74) *Attorney, Agent, or Firm*—Arent Fox LLP

(57) ABSTRACT

A multiplate clutch outer part is formed by pressing a steel plate. The multiplate clutch outer part includes: an end wall portion; and a cylindrical portion having its one end formed continuously with the outer peripheral end of the end wall portion, and opened at the other end. A bottom face of each of outer grooves is formed to be an inclined face which is getting far away from an axis of the cylindrical portion toward the open end of the cylindrical portion. Arc faces formed at inner corners of each of the outer grooves has an increasing radius of curvature toward the open end of the cylindrical portion. Thus, there is provided a multiplate clutch outer part for which press working capable of minimizing ironing resistance can be performed to reduce defective forming rate.

2 Claims, 7 Drawing Sheets

MULTIPLATE CLUTCH OUTER PART

RELATED APPLICATION DATA

The present invention is based upon Japanese priority application No. 2004-238676, which is hereby incorporated in its entirety herein by reference.

BACKGROUND OF THE INVENTION

1. Field of the Invention

The present invention relates to an improvement in a multiplate clutch outer part which is formed by pressing a steel plate and which comprises: an end wall portion; and a cylindrical portion having its one end formed continuously with an outer peripheral end of the end wall portion, and opened at the other end, the cylindrical portion including: a large number of spline grooves and spline projections which are formed in an inner peripheral face of the cylindrical portion, and which extend in an axial direction, the spline grooves and the spline projections being alternately arranged in a circumferential direction of the cylindrical portion; and outer projections and outer grooves which are formed in an outer peripheral face of the cylindrical portion, and which are arranged in positions corresponding respectively to those of the spline grooves and the spline projections.

2. Description of the Related Art

Such a multiplate clutch outer part is known, for example, as disclosed in Japanese Patent Application Laid-Open No. 3-288018.

In press working for forming such a multiplate clutch outer part, drawing for forming the cylindrical portion and ironing for forming the grooves and projections on the inner and outer peripheral faces of the cylindrical portion are simultaneously performed in parallel. In particular, the ironing resistance is increased, as the diameter of the cylindrical portion is smaller and the cylindrical portion is longer; and also increased with the progress of forming. If the ironing resistance is excessively increased, a forming defect such as crack or breakage occurs in the vicinity of the boundary between the end wall portion and the cylindrical portion.

SUMMARY OF THE INVENTION

The present invention has been achieved in view of the above-mentioned circumstances, and has an object to provide a multiplate clutch outer part for which press working capable of minimizing ironing resistance can be performed to reduce defective forming rate.

The above-mentioned object, other objects, characteristics, and advantages of the present invention will become apparent from a preferred embodiment, which will be described in detail below by reference to the attached drawings.

In order to achieve the above object, according to a first feature of the present invention, there is provided a multiplate clutch outer part which is formed by pressing a steel plate and which comprises: an end wall portion; and a cylindrical portion having its one end formed continuously with an outer peripheral end of the end wall portion, and opened at the other end, the cylindrical portion including: a large number of spline grooves and spline projections which are formed in an inner peripheral face of the cylindrical portion, and which extend in an axial direction, the spline grooves and the spline projections being alternately arranged in a circumferential direction of the cylindrical portion; and outer projections and outer grooves which are formed in an outer peripheral face of the cylindrical portion, and which are arranged in positions corresponding respectively to those of the spline grooves and the spline projections, wherein a bottom face of each of the outer grooves is formed to be an inclined face which is getting far away from an axis of the cylindrical portion toward the open end of the cylindrical portion, and wherein arc faces formed at inner corners of each of the outer grooves has an increasing radius of curvature toward the open end of the cylindrical portion.

With the first feature of the present invention, the bottom face of each of the outer grooves is formed to be an inclined face which is getting far away from the axis of the cylindrical portion toward the open end of the cylindrical portion, and the arc faces formed at the inner corners of each of the outer grooves has an increasing radius of curvature toward the open end of the cylindrical portion, that is, the bottom face and the arc face respectively have shapes by which the ironing resistance is reduced toward the open end of the cylindrical portion. Therefore, in the press working of a multiplate clutch outer part, it is possible to effectively suppress the increase in the ironing resistance in the progress of forming the bottom faces of the outer grooves and the arc faces formed at the inner corners of the outer grooves.

According to a second feature of the present invention, in addition to the first feature, the spline grooves and the spline projections are formed parallel to the axis of the cylindrical portion.

With the second feature of the present invention, in the press working of a multiplate clutch outer part, it is possible to suppress a sudden increase in the ironing resistance to greatly reduce the defective forming rate, while forming the spline grooves and the spline projections in the inner peripheral face of the cylindrical portion to be parallel to the axis of the cylindrical portion, and also improve the quality of the multiplate clutch outer part. Further, since the spline grooves and the spline projections are formed parallel to the axis of the cylindrical portion, it is possible to make constant a fitting clearance between a female spline comprising the spline grooves and the spline projections, and male splines of a plurality of clutch plates fitted to the female spline, thereby securing a smooth sliding of the clutch plates to improve the performance of the multiplate clutch.

DESCRIPTION OF THE PREFERRED EMBODIMENT

Figure 1:
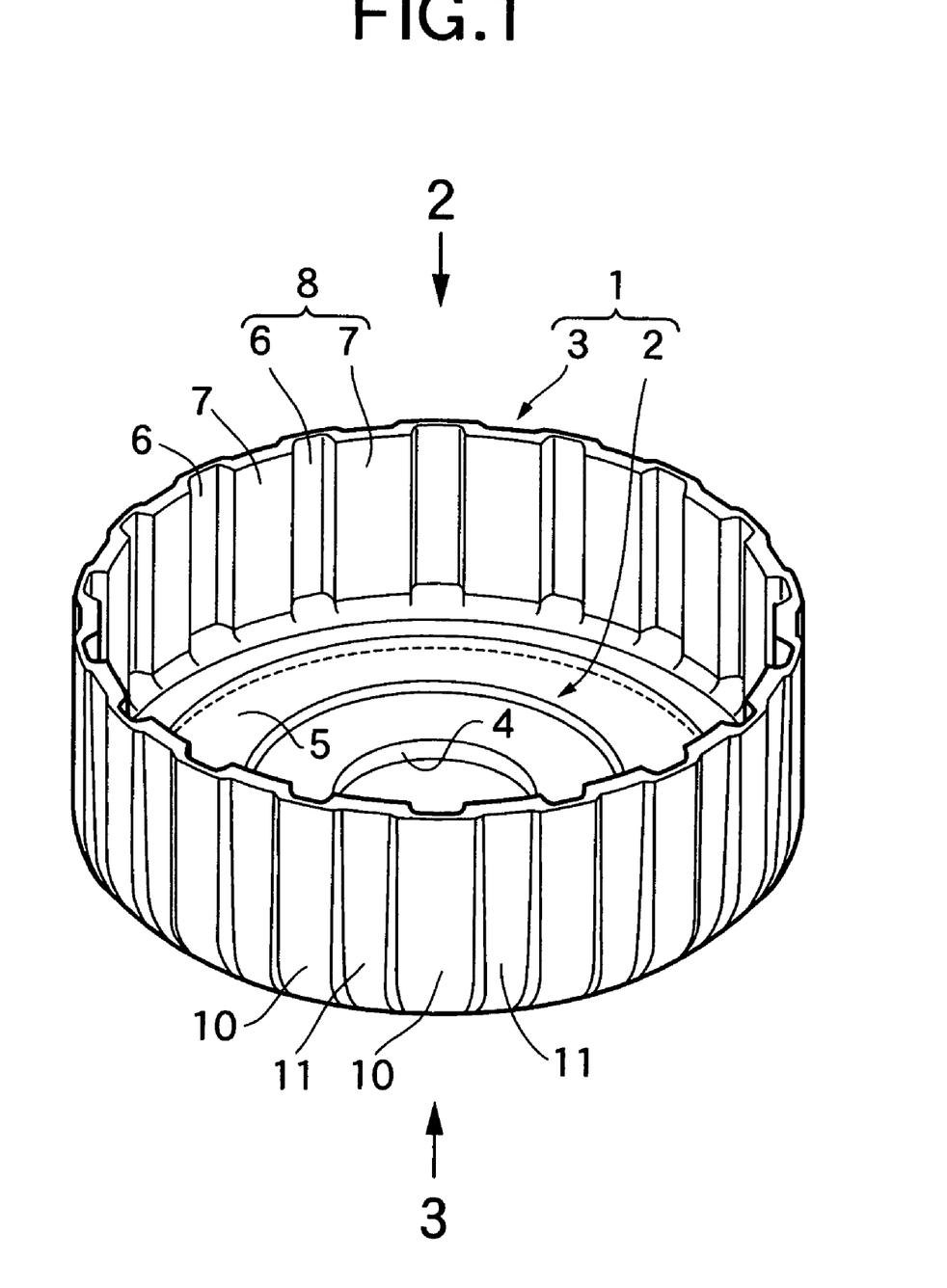
FIG. 1 is a perspective view of a multiplate clutch outer part according to an embodiment of the present invention.
Figure 2:
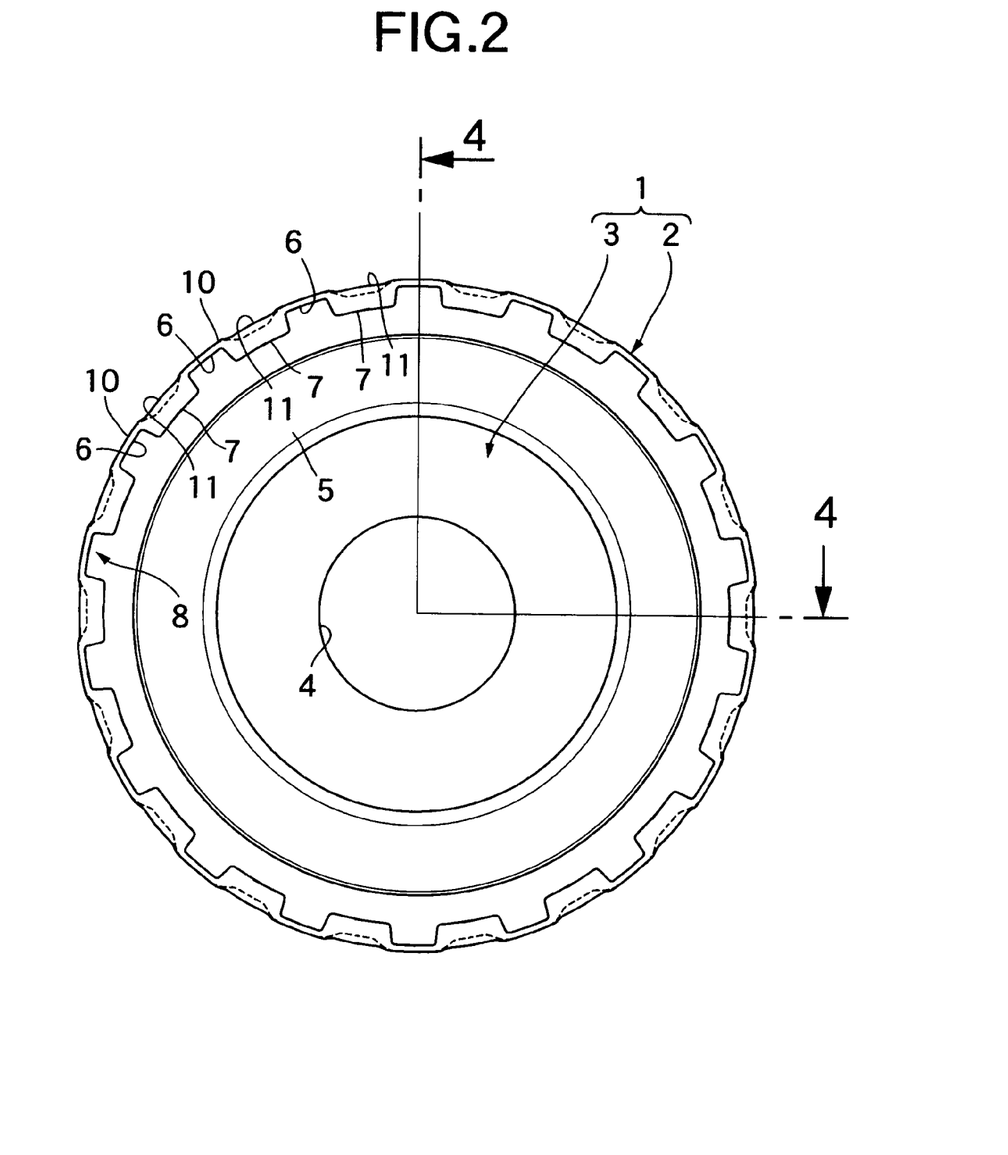
FIG. 2 is a view from arrow 2 in FIG. 1.
Figure 3:
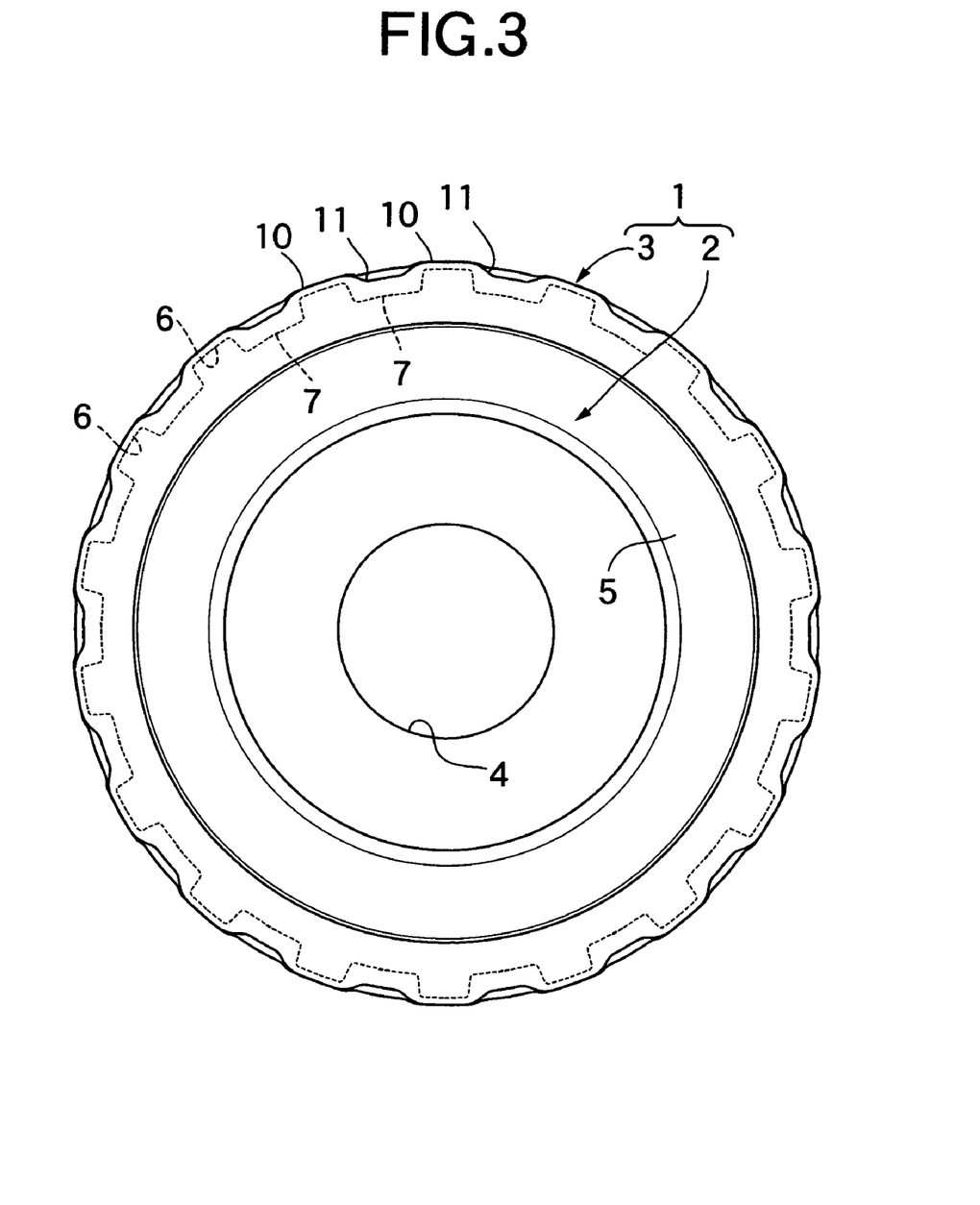
FIG. 3 is a view from arrow 3 in FIG. 1.
Figure 4:
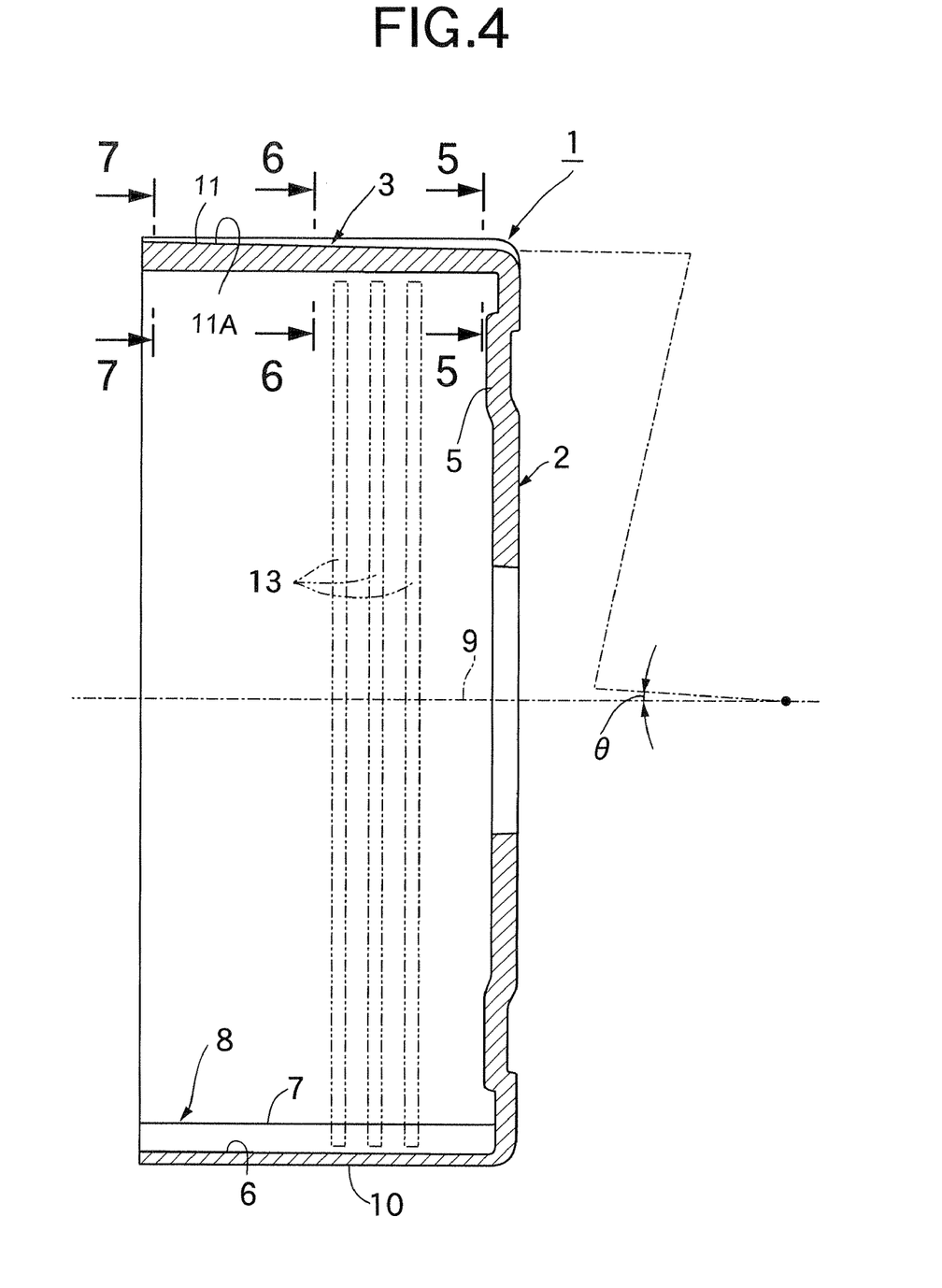
FIG. 4 is a sectional view taken along line 4-4 in FIG. 2.
Figure 5:
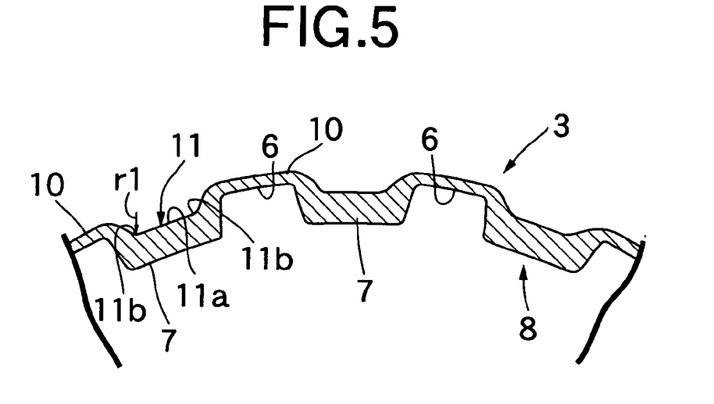
FIG. 5 is a sectional view taken along line 5-5 in FIG. 4.
Figure 6:
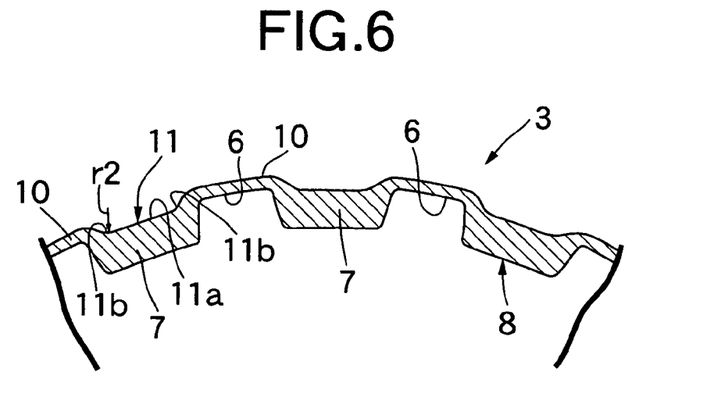
FIG. 6 is a sectional view taken along line 6-6 in FIG. 4.
Figure 7:
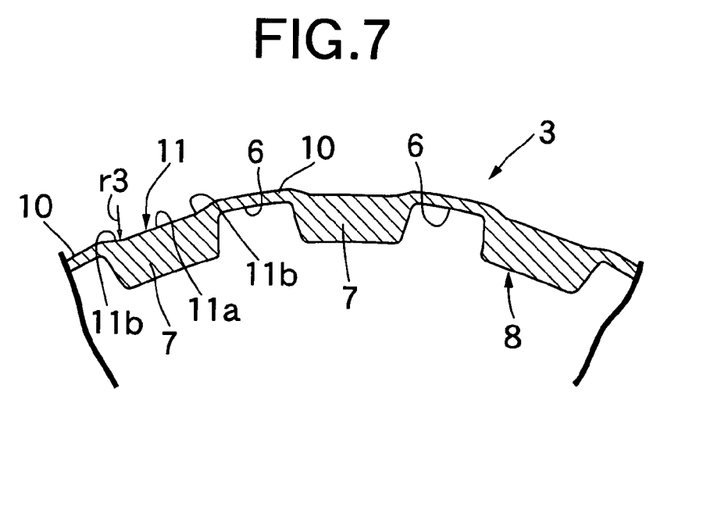
FIG. 7 is a sectional view taken along line 7-7 in FIG. 4.

In FIG. 1, a reference numeral 1 denotes an outer part for a wet multiplate clutch used in an automobile, a motorcycle or the like. The multiplate clutch outer part 1 has an end wall portion 2 and a cylindrical portion 3 having its one end formed continuously with the outer peripheral end of the end wall portion 2, and opened at the other end. The multiplate clutch outer part 1 is formed by pressing one steel plate.

As shown in FIGS. 1 to 4, in the multiplate clutch outer part 1, a positioning hole 4 is bored at a center of the end wall portion 2, and an annular rib 5 is formed in the end wall portion 2 at an radially intermediate position so as to project into the cavity in the end wall portion 2. A large number of spline grooves 6 and spline projections 7 extending in the axial direction of the cylindrical portion 3 are formed in the inner peripheral face of the cylindrical portion 3. The spline grooves 6 and the spline projections 7 are alternately arranged in the circumferential direction of the cylindrical portion 3. Further, the spline grooves 6 and the spline projections 7 are formed to be parallel to an axis 9 of the cylindrical portion 3, as clearly shown in FIG. 4. Furthermore, the spline grooves 6 and the spline projections 7 form a female spline 8, to which male splines formed on the outer peripheries of a plurality of clutch plates 13 are slidably fitted.

A large number of outer projections 10 and outer grooves 11 are formed on the outer peripheral face of the cylindrical portion 3, at positions corresponding respectively to those of the spline grooves 6 and the spline projections 7. A bottom face 11a of each of the outer grooves 11 is formed to be an inclined face, as shown by θ in FIG. 4, which is getting far away from an axis 9 of the cylindrical portion 3 toward the open end of the cylindrical portion 3. Also, as shown in FIGS. 2, 3, and 5 to 7, arc faces 11b are formed at inner corners of each of the outer grooves 11 so that their radius of curvature gradually increases toward the open end of the cylindrical portion, that is, r1<r2<r3 (see FIGS. 5 to 7).

Figure 8:
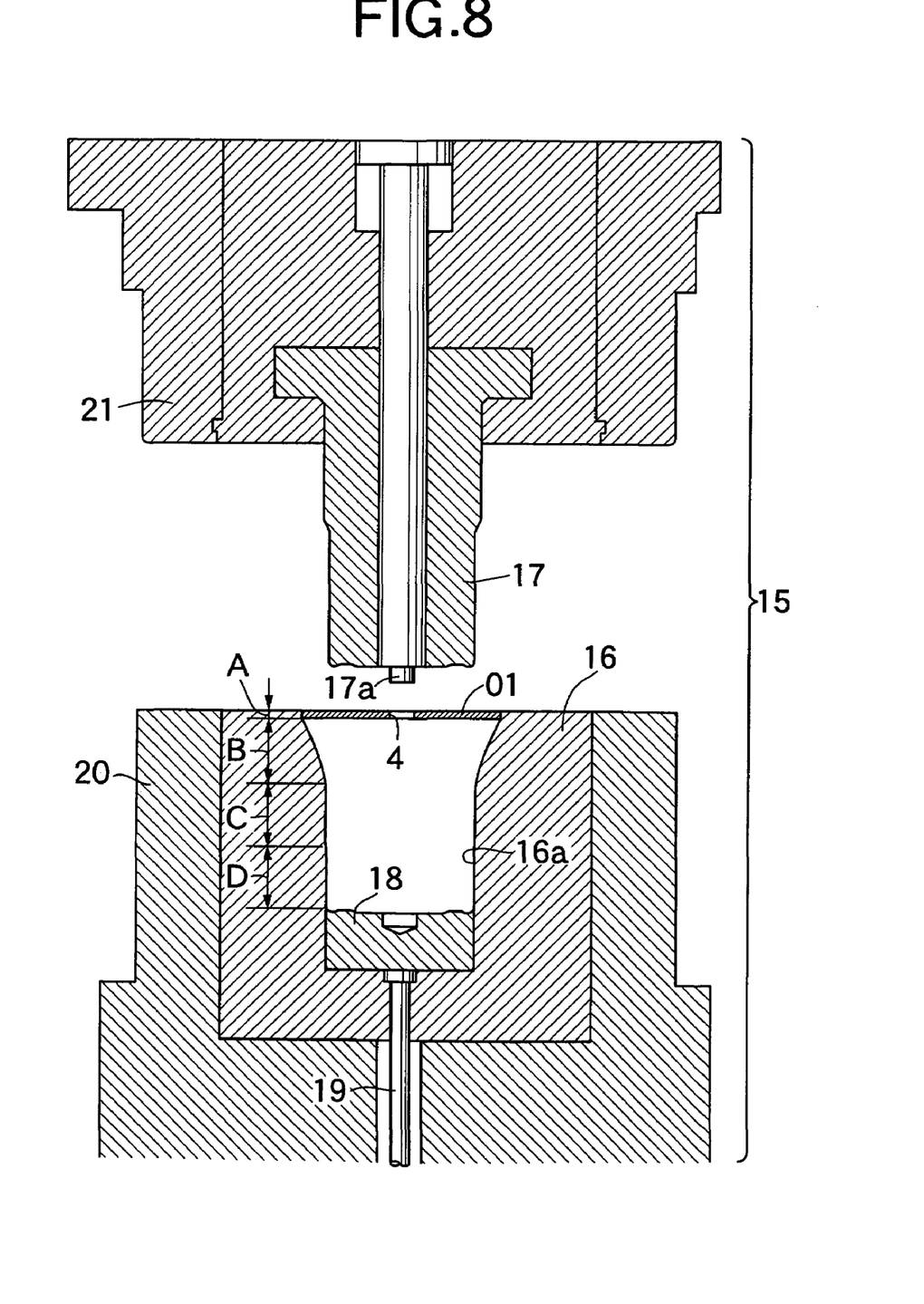
FIG. 8 is a longitudinal sectional view of a forming die device for forming the multiplate clutch outer part.

FIG. 8 shows a die device 15 used in the press working for forming the above-described multiplate clutch outer part 1. The die device 15 comprises: a die 16 held on a stationary die holder 20 and having a forming cavity 16a; a punch 17 held on a vertically movable punch holder 21 and fitted in the forming cavity 16a; and a knockout block 18 disposed in a bottom portion of the forming cavity 16a. A positioning pin 17a projects from the end of the punch 17. A vertically moving rod 19 for vertically moving the knockout block 18 is joined to the knockout block 18.

The forming cavity 16a has, sequentially from the upper open end side, a blank mount portion A, a rough drawing region B having a funnel-shaped inner periphery, a drawing region C having an inner peripheral shape very similar to the outer peripheral shape of the multiplate clutch outer part 1, and an ironing region D having an inner peripheral shape precisely corresponding to the outer peripheral shape of the multiplate clutch outer part 1.

An end portion of the punch 17 is provided with an outer peripheral shape precisely corresponding to the inner peripheral shape of the multiplate clutch outer part 1, and an end face shape precisely corresponding to the inner face of the end wall portion 2. The knockout block 18 is provided with an end face shape precisely corresponding to the outer face of the end wall portion 2.

Figure 9:
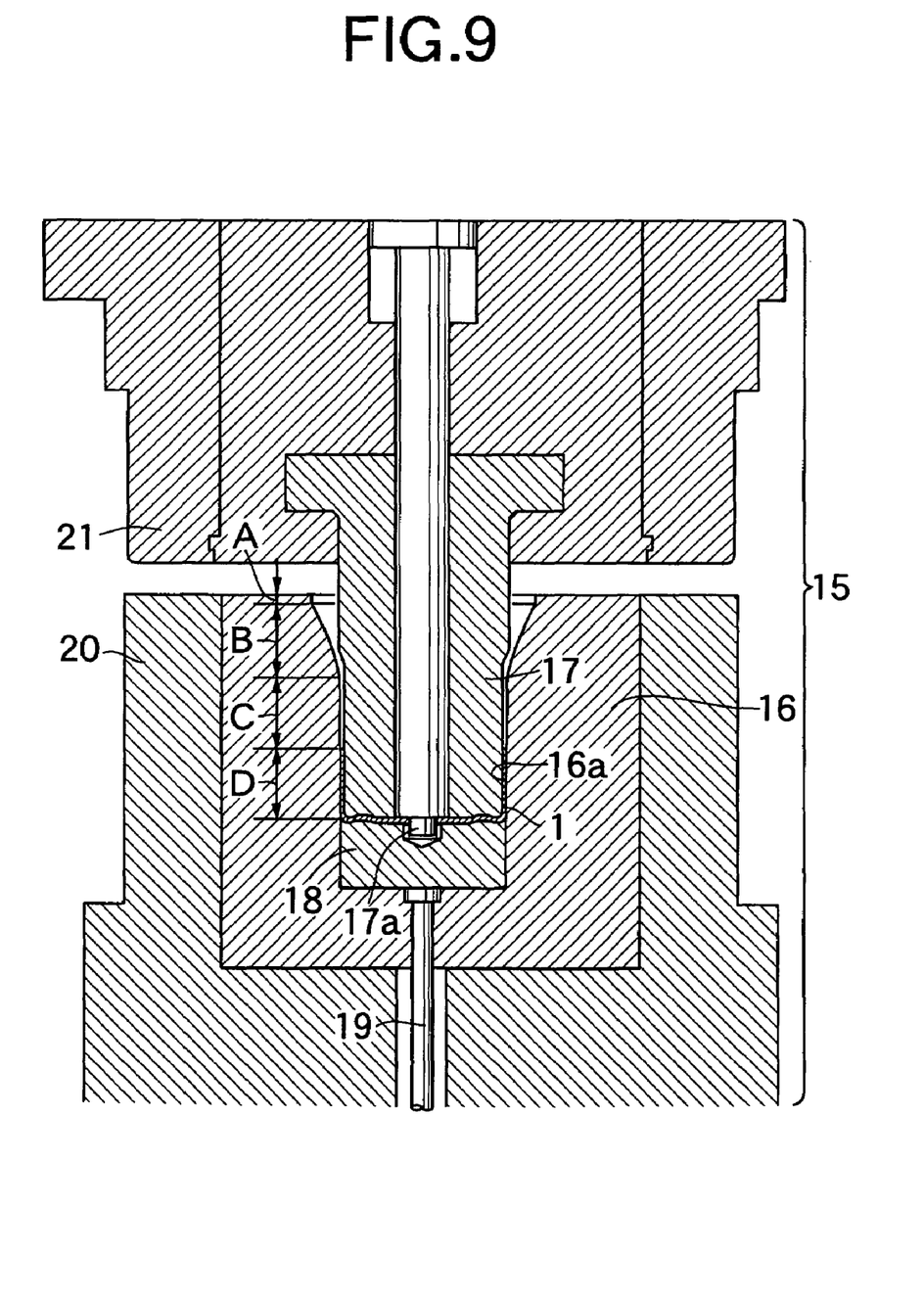
FIG. 9 is a diagram for explaining the operation of the forming die device.

In order to form the multiplate clutch outer part 1, a blank, i.e., a steel plate 01 having the positioning hole 4 at its center is mounted in the blank mount portion A of the forming cavity 16a, and the punch 17 is then moved downward toward the forming cavity 16a. Next, the punch 17 is advanced to the rough drawing region B, the drawing region C and the ironing region D, to finally form the steel plate 01 into the multiplate clutch outer part 1 as shown in FIG. 9. The formed multiplate clutch outer part 1 can be moved out of the forming cavity 16a by moving the knockout block 18 upward together with the punch 17. Thereafter, the open end face of the cylindrical portion 3 is worked to be flat by cutting.

When the punch 17 is advanced to the drawing region C and the ironing region D, there are simultaneously progressed, in parallel, drawing for forming the cylindrical portion 3 and ironing for forming the spline grooves 6 and the spline projections 7 on the inner periphery of the cylindrical portion 3 and forming the outer projections 10 and the outer grooves 11 on the outer periphery of the cylindrical portion 3; and the ironing resistance generally tends to increase with the progress of the drawing and ironing. However, according to the present invention, as described above, the bottom face 11a of each of the outer grooves 11 is formed to be an inclined face which is getting far away from an axis 9 of the cylindrical portion 3 toward the open end of the cylindrical portion 3, and the arc faces 11b are formed at inner corners of each of the outer grooves 11 so that their radius of curvature gradually increases toward the open end of the cylindrical portion, that is, the bottom face and the arc face respectively have shapes by which the ironing resistance is reduced toward the open end of the cylindrical portion. Therefore, it is possible to effectively suppress the increase in the ironing resistance at least in the progress of forming the bottom faces 11a of the outer grooves 11 and the arc faces 11b formed at the inner corners of the outer grooves 11. Thus, it is possible to suppress a sudden increase in the ironing resistance to greatly reduce the defective forming rate, while forming the spline grooves 6 and the spline projections 7 in the inner peripheral face of the cylindrical portion 3 to be parallel to the axis 9 of the cylindrical portion 3, and also improve the quality of the multiplate clutch outer part 1.

Further, since the spline grooves 6 and the spline projections 7 are formed to be parallel to the axis 9 of the cylindrical portion 3, it is possible to make constant a fitting clearance between a female spline 8 comprising the spline grooves 6 and the spline projections 7, and male splines of a plurality of clutch plates 13 fitted to the female spline 8, thereby securing a smooth sliding of the clutch plates 13 to improve the performance of the multiplate clutch.

The present invention is not limited to the above-described embodiment, and various modifications in design can be made without departing from the subject mater of the invention.

What is claimed is:

1. A multiplate clutch outer part which is formed by pressing a steel plate and which comprises:
    an end wall portion; and
    a cylindrical portion having its one end formed continuously with an outer peripheral end of the end wall portion, and opened at the other end,
    the cylindrical portion including:

a plurality of spline grooves and spline projections which are formed in an inner peripheral face of the cylindrical portion, and which extend in an axial direction, the spline grooves and the spline projections being alternately arranged in a circumferential direction of the cylindrical portion; and outer projections and outer grooves which are formed in an outer peripheral face of the cylindrical portion, and which are arranged in positions corresponding respectively to those of the spline grooves and the spline projections, wherein a bottom face of each of the outer grooves is formed to be an inclined face which is farther from an axis of the cylindrical portion toward the open end of the cylindrical portion, and wherein arc faces formed at inner corners of each of the outer grooves has an increasing radius of curvature toward the open end of the cylindrical portion.

2. The multiplate clutch outer part according to claim 1, wherein the spline grooves and the spline projections are formed parallel to the axis of the cylindrical portion.

* * * * *